(12) United States Patent
Chuang et al.

(10) Patent No.: US 6,356,918 B1
(45) Date of Patent: Mar. 12, 2002

(54) METHOD AND SYSTEM FOR MANAGING REGISTERS IN A DATA PROCESSING SYSTEM SUPPORTS OUT-OF-ORDER AND SPECULATIVE INSTRUCTION EXECUTION

(75) Inventors: Chiao-Mei Chuang, Cupertino, CA (US); Hung Qui Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/507,542

(22) Filed: Jul. 26, 1995

(51) Int. Cl.$^7$ .............................................. G06F 12/00

(52) U.S. Cl. ...................... 707/203; 707/202; 712/34; 712/218; 712/219; 712/228; 712/230; 712/233; 712/234; 712/236

(58) Field of Search ................................ 707/203, 202; 712/34, 218–219, 228, 230, 233, 234, 239; 711/109; 708/709

(56) References Cited

U.S. PATENT DOCUMENTS

| | | | |
|---|---|---|---|
| 4,388,682 A | 6/1983 | Eldridge | 712/211 |
| 4,455,604 A | 6/1984 | Ahlstrom et al. | 712/211 |
| 4,456,954 A | 6/1984 | Bullions, III et al. | 711/207 |

(List continued on next page.)

FOREIGN PATENT DOCUMENTS

| | | | |
|---|---|---|---|
| EP | 0 463 973 A2 | 1/1992 | G06F/9/38 |
| EP | 0 514 763 A2 | 11/1992 | G06F/9/38 |

OTHER PUBLICATIONS

IEEE publication, "The named–state register file: implementation and performance" by Peter Nuth et al., Hewlett Packard Labs., pp. 4–13, Jan. 1995.*

IEEE publication, Organization, management and VLSI implementation of a multiple register window file for LISP–oriented architectures: by B. Furht et al., Dept. of Electrical and Computer Science, Coral Gables, Florida, pp. 238–247, Jan. 1998.*

IBM Technical Disclosure Bulletin, "Multisequencing a Single Instruction Stream Register Renaming and the Size of the Common Virtual Register File", vol. 36, No. 04, Apr. 1993.

*Primary Examiner*—Thomas Black
*Assistant Examiner*—Diane D. Mizrahi
(74) *Attorney, Agent, or Firm*—Anthony V.S. England; Bracewell & Patterson L.L.P.

(57) ABSTRACT

A method and a system in a data processing system for managing registers in a register array wherein the data processing system has M architected registers and the register array has greater than M registers. A first physical register address is selected from a group of available physical register addresses in a renamed table in response to dispatching a register-modifying instruction that specifies an architected target register address. The architected target register address is then associated with the first physical register address, and a result of executing the register-modifying instruction is stored in a physical register pointed to by the first physical register address. In response to completing the register-modifying instruction, the first physical address in the rename table is exchanged with a second physical address in a completion renamed table, wherein the second physical address is located in the completion rename table at a location pointed to by the architected target register address. Therefore, upon instruction completion, the completion rename table contains pointers that map architected register addresses to physical register addresses. The rename table maps architected register addresses to physical register addresses for instructions currently being executed, or for instructions that have "finished" and have not yet been "completed." Bits indicating the validity of an association between an architected register address and a physical register address are stored before instructions are speculatively executed following an unresolved conditional branch.

14 Claims, 11 Drawing Sheets

U.S. PATENT DOCUMENTS

| | | | |
|---|---|---|---|
| 4,574,349 A | 3/1986 | Rechtschaffen | 711/154 |
| 4,612,612 A | 9/1986 | Woffinden et al. | 711/207 |
| 4,691,277 A | 9/1987 | Kronstadt et al. | 711/213 |
| 4,853,849 A | 8/1989 | Bain, Jr. et al. | 711/202 |
| 4,901,222 A | 2/1990 | Joyce et al. | 714/15 |
| 4,901,233 A | 2/1990 | Liptay | 712/28 |
| 4,943,913 A | 7/1990 | Clark | 711/206 |
| 4,956,805 A | 9/1990 | Biffle et al. | 710/65 |
| 4,992,938 A | 2/1991 | Cocke et al. | 712/217 |
| 5,134,561 A | 7/1992 | Liptay | 711/164 |
| 5,144,551 A | 9/1992 | Cepulis | 711/163 |
| 5,167,023 A | 11/1992 | de Nicolas et al. | 703/27 |
| 5,371,684 A | 12/1994 | Iadonato et al. | 716/9 |
| 5,764,970 A * | 6/1998 | Rana et al. | 712/233 |
| 5,777,918 A * | 7/1998 | Chan et al. | 708/709 |
| 5,974,240 A * | 10/1999 | Chan | 712/236 |

\* cited by examiner

Rename Table and Completion Rename Table Configuration
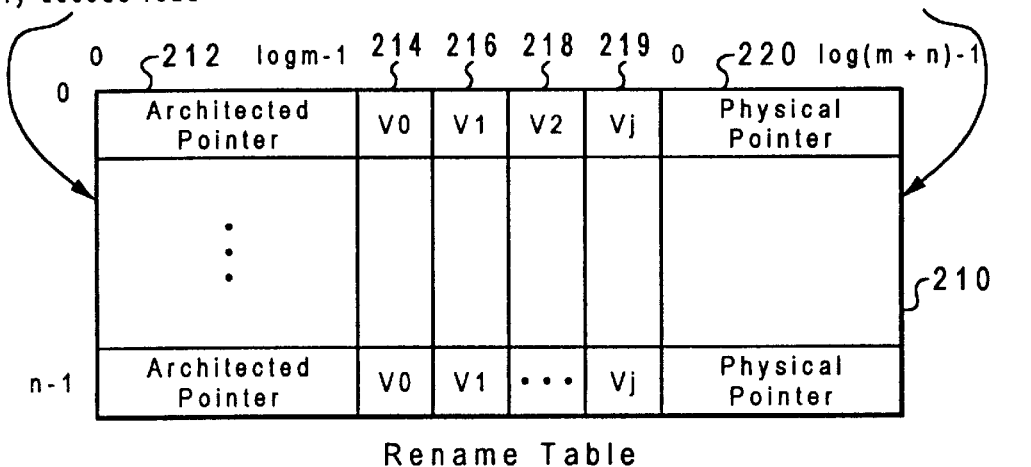
*Fig. 3A*
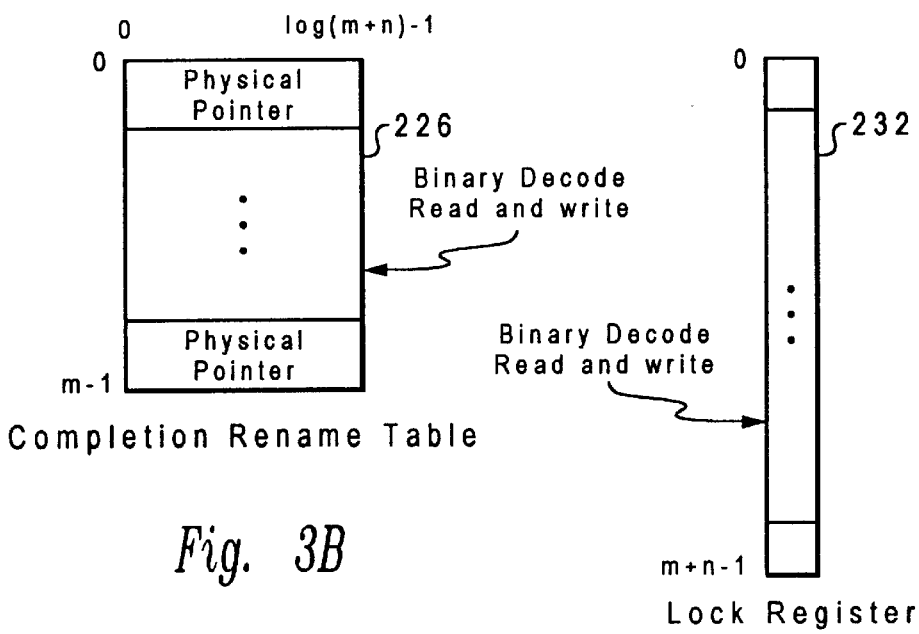
*Fig. 3B*
*Fig. 3C*

METHOD AND SYSTEM FOR MANAGING REGISTERS IN A DATA PROCESSING SYSTEM SUPPORTS OUT-OF-ORDER AND SPECULATIVE INSTRUCTION EXECUTION

BACKGROUND OF THE INVENTION

1. Technical Field

The present invention relates in general to an improved data processing system, and in particular to a method and system for managing addressable registers in a data processing system. More particularly, the present invention relates to a method and system for controlling and monitoring a register array in a data processing system that processes out of sequence instructions, and a method and system that provides register content restoration upon the occurrence of an interrupt condition or the determination that instructions in a mispredicted branch have been executed.

2. Description of the Related Art:

The design of a typical computer data processing system requires the establishment of a fixed number of addressable registers, such as general purpose registers (GPR's) and floating-point registers (FPR's), for the programmer to use in designing programs for the data processing system. Changing the number of architecturally available registers once a system is available would require substantial rewriting of programs to make use of the newly added registers.

The design of computers and computer programs is also based on the assumption that computer data processing system program instructions are executed by the data processing system in the order in which they are written in the program and loaded into the data processing system. While instructions must logically appear to the data processing system to have been executed in program order, it has been learned in an effort to improve computer performance that some instructions do not have to be physically performed in program order, provided that certain dependencies do not exist with other instructions. Further, if some instructions are executed out-of-order, and one of such instructions is a branch instruction, wherein a branch prediction is made to select the subsequent instruction sequence, a need to restore the registers affected by instructions in the predicted branch to their original values can occur if the branch is mispredicted. In such a case, the data processing system is restored to the condition before the branch was taken. The process of efficiently executing instructions out of order requires that values for registers prior to the predicted branch be maintained for registers affected by the instructions following the branch, while provision is made to contingently store new values for registers affected by instructions following the predicted branch. When branch instructions are resolved, the contingency of the new register values is removed, and the new values become the established values for the registers.

Large processors have for many years employed overlapping techniques under which multiple instructions in the data processing system are in various states of execution at the same time. Such techniques may be referred to as pipelining. Whenever pipelining is employed, control logic is required to detect dependencies between instructions and alter the usual overlapped operation so that results of the instructions are those that follow the one-instruction-at-a-time architectural data processor model. In a pipelined machine, separate hardware is provided for different stages of an instruction's processing. When an instruction finishes it's processing at one stage, it moves to the next stage, and the following instruction may move into the stage just vacated.

In many pipelined machines, the instructions are kept in sequence with regard to any particular stage of its processing, even though different stages of processing for different instructions are occurring at the same time. If the controls detect that a result that has not yet been generated is needed by some other executing instruction, the controls must stop part of the pipeline until the result is generated and passed to the part of the pipeline where it is needed. Although this control logic can be complex, keeping instructions in sequence in the pipeline helps to keep the complexity under control.

A more complex form of pipelining occurs if the data processing system includes separate execution units. Because different instructions have different execution times in their particular type of execution unit, and because the dependencies between instructions will vary in time, it is almost inevitable that instructions will execute and produce their results in a sequence different from the program order. Keeping such a data processing system operating in a logically correct manner requires more complex control mechanisms than that required for pipeline organization.

One problem that arises in data processing systems having multiple executions units is providing precise interrupts at arbitrary points in program execution. For example, if an instruction creates an overflow condition, by the time such overflow is detected, it is entirely possible that a subsequent instruction has already executed and placed a result in a register or in main storage—a condition that should exist only after the interrupting instruction has properly executed. Thus, it is difficult to detect an interruption and preserve status of the data processing system with all prior but no subsequent instructions having been executed. In this example, the overflow interrupt will actually be recognized later than it occurred. Other similar situations are possible in the prior art.

Designers of some prior art data processing systems chose to handle interrupts by allowing all instructions that were in some state of execution at the time of the interrupt to complete their execution as much as possible, and then take an "imprecise" interruption which reported that some instruction in the recent sequence of instructions had created an interrupt condition. This may be a reasonable way to handle interrupts for conditions such as overflow, where results will be returned to a programmer who will fix a program bug or correct the input data, and then rerun the program from the beginning. However, this is an unacceptable way to handle interrupts like page faults, where the system program will take some corrective action and then resume execution from the point of interruption.

Applicant is aware of U.S. Pat. No. 4,574,349, in which additional registers are provided to be associated with each GPR and in which register renaming occurs with the use of a pointer value. However, this patent does not solve the problem of precise recovery from interrupts or recovery from incorrectly guessed branches during out-of-order execution.

In an article in the IBM Technical Disclosure Bulletin, entitled "General Purpose Register Extension," August, 1981, pages 1404–1405 discloses a system for switching between multiple GPR sets to avoid use of storage when switching subroutines. Another article in the IBM Technical Disclosure Bulletin, entitled "Vector-Register Rename Mechanism," June, 1982, pages 86–87 discloses the use of a dummy register during instruction execution. When execution is complete, the register is renamed as the architected register named by the instruction for receiving results.

During execution, the register is transparent and this allows for extra physical registers. However, neither of these articles deals with the problems caused by out-of-order instruction execution.

An article in the IBM Technical Disclosure Bulletin, entitled "Use of a Second Set of General Purpose Registers to Allow Changing General-Purpose Registers During Conditional Branch Resolutions," August, 1986, pages 991–993 shows a one-for-one matched secondary set of GPRs to hold the original GPR contents during conditional branch resolution so that such GPR contents may be used to restore the system status if necessary. Conditional mode tags are used with the GPRs to regulate status of the registers, or to restore the original contents of the register.

SUMMARY OF THE INVENTION

It is therefore one object of the present invention to provide an improved data processing system.

It is another object of the present invention to provide a method and system for managing addressable registers in a data processing system.

It is yet another object of the present invention to provide a method and system for controlling and monitoring a register array in a data processing system that processes out-of-sequence instructions, and provide a method and system that provides register content restoration upon the occurrence of an interrupt condition or the determination that instructions in a mispredicted branch have been executed.

The present invention provides a register management system for the addressable registers associated with the central processing unit (CPU) of a data processing system. The register management system provides for out-of-order execution of instructions and includes mechanisms for precise recovery from a mispredicted conditional branch or an interrupt condition.

The foregoing objects are achieved as is now described. In a data processing system having M architected registers and a register array that includes a number of registers greater than M, a first physical register address is selected from a rename table in response to dispatching a register-modifying instruction having an architected target register address. The first physical register address is selected from a group of available physical register addresses in the rename table. The architected target register address is then associated with the first physical register address and a result of executing the register-modifying instruction is stored in a physical register pointed to by the first physical register address. In response to completing the register-modifying instruction, the first physical address in the rename table is exchanged with a second physical address in a completion rename table wherein the second physical address is stored in the completion rename table at a location pointed to by the architected target register address. Thus, the completion rename table contains pointers that map architected register addresses to physical register addresses. And similarly, the rename table maps architected register addresses to physical register addresses for instructions currently being executed, or for instructions that have "finished" and have not yet been "completed." Bits showing the validity of an association between an architected register address and a physical register address are stored before instructions are executed following an unresolved conditional branch. Such data bits are available to restore the condition of the rename table to its condition prior to the conditional branch upon determining that the conditional branch was mispredicted. Because instructions following a conditional branch are never completed before branch resolution, means for restoring address pointers in the completion rename table to a condition prior to the conditional branch is not needed. Therefore, the need to preserve an entire table of register remapping pointers is eliminated by storing selected bits in the rename table. Head and tail pointers in the rename table point to physical register addresses available for association with newly dispatched architected register addresses, and physical register addresses ready for storage in the completion rename table when its associated instruction is completed.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3D depict various tables and table fields in accordance with the method and system of the present invention;

DETAILED DESCRIPTION OF THE PREFERRED EMBODIMENT

Figure 1:
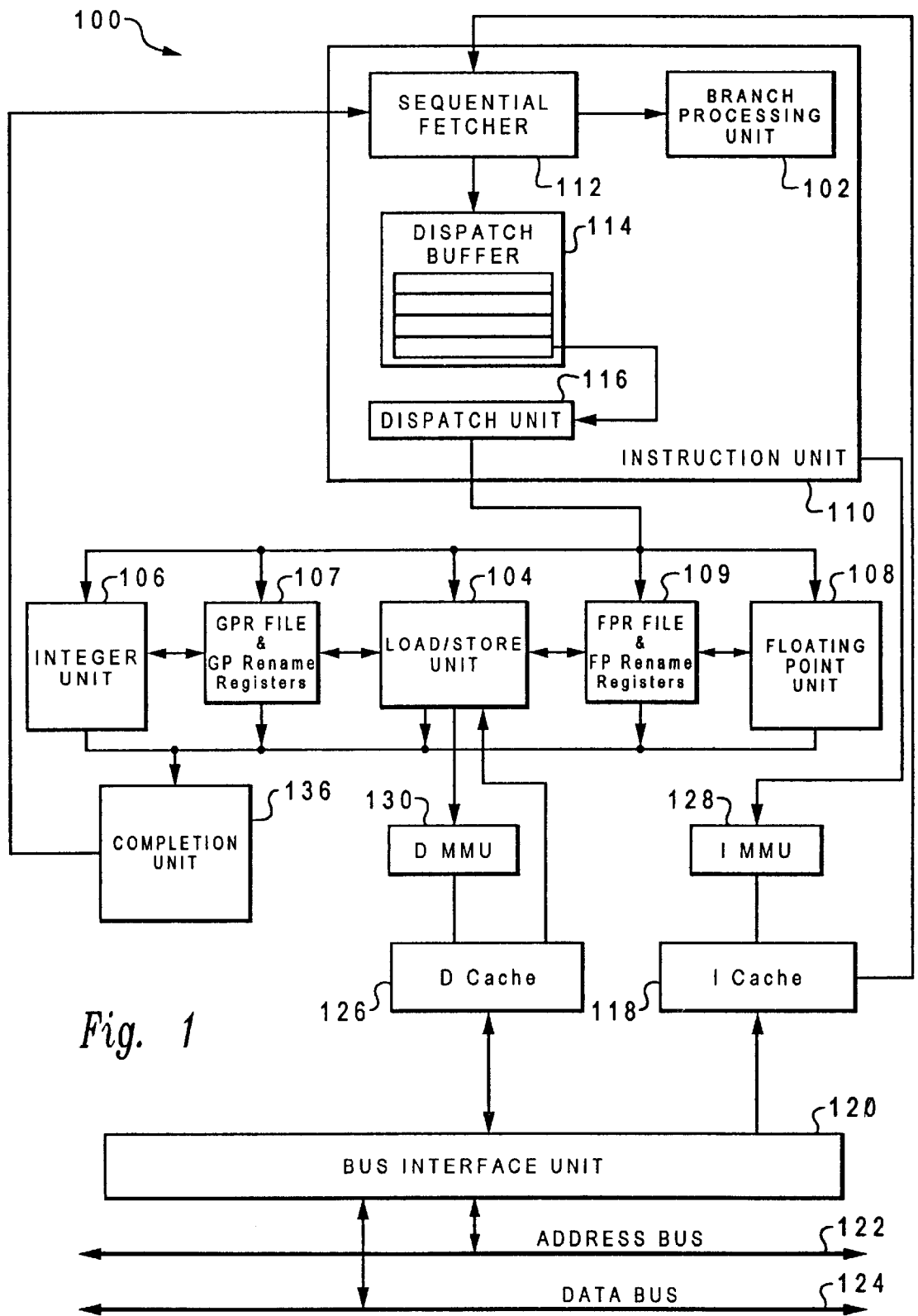
FIG. 1 depicts a superscaler data processing system in accordance with a preferred embodiment of the present invention.

With reference now to the figures, and in particular with reference to FIG. 1, there is depicted a superscaler data processing system in accordance with the method and system of the present invention. Note that data processing system 100 is illustrated as a conceptual block diagram intended to show the basic features rather than an attempt to show how these features are physically implemented on a chip.

A superscaler processor is one that issues multiple independent instructions into multiple pipelines allowing multiple instructions to execute in parallel. As illustrated in FIG. 1, superscaler data processing system 100 includes five independent execution units and two register files. The five independent execution units may include: branch processing unit (BPU) 102, load/store unit 104, integer unit 106, and flowing-point unit 108. Register files may include: general purpose register file (GPR) 107 for integer operands, and floating-point register file (FPR) 109 for single-space or double-precision floating-point operands. Furthermore, both GPR 107 and FPR 109 may include a set of rename registers.

Instruction unit 110 contains sequential fetcher 112, dispatch buffer 114, dispatch unit 116, and branch processing unit 102. Instruction unit 110 determines the address of the next instruction to be fetched based upon information received from sequential fetcher 112 and branch processing unit 102.

Sequential fetcher 112 fetches instructions from instruction cache 118 and loads such instructions into dispatch buffer 114. Branch instructions are identified by sequential fetcher 112, and forwarded to branch processing unit 102 directly, bypassing dispatch buffer 114. Such a branch instruction is either executed and resolved (if the branch is unconditional or if required conditions are available), or is predicted. Non-branch instructions are issued from dispatch buffer 114, with the dispatch rate being contingent on execution unit busy status, rename and completion buffer availability, and the serializing behavior of some instructions. Instruction dispatch is done in program order. BPU 102 uses static and dynamic branch prediction -on unresolved conditional branches to allow instruction unit 110 to fetch instructions from a predicted target instruction stream while a conditional branch is evaluated. Branch processing unit 102 folds out branch instructions for unconditional branches or conditional branches unaffected by instructions in progress in the execution pipeline.

Dispatch buffer 114 holds several instructions loaded by sequential fetcher 112. Sequential fetcher 112 continuously loads instructions to keep the space in dispatch buffer 114 filled. Instructions are dispatched to their respective execution units from dispatch unit 116. In operation, instructions are fetched from instruction cache 118 and placed in either dispatch buffer 114 or branch processing unit 102. Instructions entering dispatch buffer 114 are issued to the various execution units from dispatch buffer 114, and instructions are frequently dispatched more than one at a time, which may require renaming of multiple target registers according to the method and system described below. Dispatch buffer 114 is the backbone of the master pipeline for superscaler data processing system 100, and may contain, for example, an 8-entry queue. If while filling dispatch buffer 114, a request from sequential fetcher 112 misses in instruction cache 118, then arbitration for a memory access will begin.

Data cache 126 provides cache memory function for load/store unit 104. Instruction memory management unit 128 and data memory management unit 130 support accesses to virtual memory and physical memory for both instructions and data, respectively. Such memory management units perform address translations and determine whether a cache hit or miss has occurred.

Bus interface unit 120 controls access to the external address and data buses by participating in bus arbitration. The external address bus is shown at reference numeral 122, and the external data bus is shown at reference numeral 124.

Completion unit 136 retires executed instructions from an instruction sequencing table (IST) in the completion unit and updates register files and control registers. An instruction is retired from the IST when it has "finished" execution and all instructions ahead of it have been "completed." The instruction's result is made visible in the appropriate register file at or after completion. Several instructions can complete simultaneously. Completion unit 136 also recognizes exception conditions and discards any operations being performed on subsequent instructions in program order.

Figure 2:
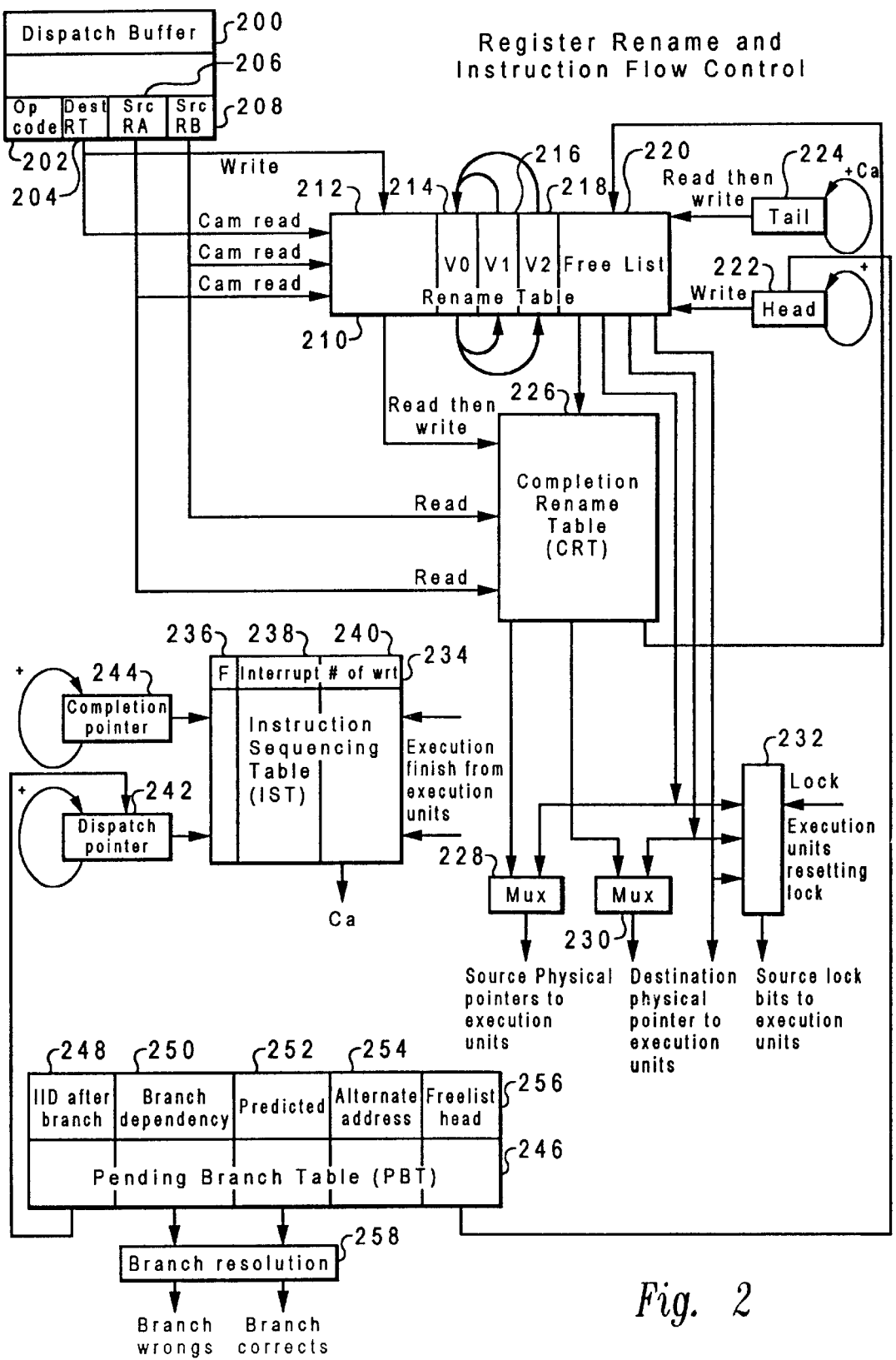
FIG. 2 is a high-level block diagram illustrating the components of, and the data flow in, the method and system for managing a register array in accordance with the present invention.

With reference now to FIG. 2, there is depicted a high-level block diagram illustrating the components of, and the data flow in, the method and system for managing a register array in accordance with the present invention. As illustrated, dispatch buffer 200 holds instructions awaiting dispatch to an execution unit. Such instructions may contain fields that hold op-code 202, architected target register address 204, architected source-A register address 206, and architected source-B register address 208.

Coupled to dispatch buffer 200 is rename table 210. The number of table entries in rename table 210 is equal to the number of additional physical registers (i.e., the number of registers in the register array that is greater than the number of architected registers). According to an important aspect of the present invention, rename table 210 is implemented with a content addressable memory (CAM). Content addressable memory is memory that allows data to be retrieved in response to a match in one or more searched fields. Such searched fields of rename table 210 include field 212 for storing architected register address pointers, field 214 for storing data that indicates the contents of a particular rename table entry are valid or active, field 216 and 218 for temporarily storing data from field 214, and field 220 for storing physical address pointers.

Also associated with rename table 210 are a pair of circular pointers for pointing to particular entries in rename table 210. Such pointers are head pointer 222 and tail pointer 224. Head pointer 222 is utilized to select the next rename table entry to receive and store an architected target register address from dispatch buffer 200. Tail pointer 224 is utilized to point to physical address pointers that will be processed when the instruction associated with the table entry is completed. Both head and tail pointers may be incremented by one or more counts, and wrapped around from table entries at the bottom of the rename table to table entries at the top of the rename table.

Completion rename table (CRT) 226 is coupled to rename table 210 and dispatch buffer 200, and stores physical register address pointers that map architected register addresses to physical addresses within the data processing system. The number of table entries in completion rename table 226 is equal to the number of architected registers in the data processing system. To locate data that should be stored in an architected register, completion rename table 226 is addressed with the architected register address to recall a physical register address that holds the current contents of that particular architected register. As illustrated, completion rename table 226 is addressed by data from field 212 in rename table 210, and architected source-A and -B register address fields 206 and 208. Information retrieved from completion register rename table 226 is provided to the execution units during dispatch and to field 220 of rename table 210 during instruction completion.

MUXes 228 and 230 are coupled to both completion rename table 226 and rename table 210 for receiving physical address pointers. Outputs of MUXes 228 and 230 provide physical address pointers to execution units SO that the execution units may locate the proper input operands and store the result of executing an instruction in the proper output register or target register.

MUXes 228 and 230 also communicate data to and from lock register 232. Lock register 232 stores information used to prevent execution units from using data in selected registers, often because such data is not yet valid. Typically, lock register 232 includes a single bit associated with each register in the data processing system. As execution units finish instructions, and data in physical registers becomes valid for use by other instructions, bits in lock register 232 are set to "unlock" the use of data in corresponding physical registers.

Instruction sequencing table 234 includes a field 236 for storing an "F" bit, a field 238 for storing an interrupt indicator, and a field 240 for storing a value that indicates the number of registers affected by an instruction associated with the particular table entry.

Instruction sequencing table 234 is loaded with data at the table entry pointed to by dispatch pointer 242. Completion pointer 244 is used to retrieve information from instruction sequencing table 234 at completion time of an instruction having an instruction ID that is same as the completion pointer value. Dispatch pointer 242 has the same value as the instruction ID of instructions currently being dispatched from dispatch buffer 200. Dispatch pointer 242 and completion pointer 244 are circular pointers that have values ranging from zero to the highest instruction ID in the data processing system. Since superscalar data processing system 100 allows multiple instruction dispatching and completion, dispatch pointer 242 and completion pointer 244 may be incremented by one or more counts, depending upon the number of instructions dispatched and completed in a cycle respectively. Instruction IDs are numbers that are associated with instructions dispatched from dispatch buffer 200 at dispatch time for the purpose of tracking instruction execution of multiple instructions in the data processing system.

Pending branch table 246 is used to store information that aids recovery of various pointers and addresses once the determination has been made that a conditional branch has been mispredicted. Pending branch table 246 includes a number of table entries equal to the number of speculative branches supported by the data processing system. Fields included in pending branch table 246 include: Field 248 for storing the instruction ID of an instruction that immediately follows a conditional branch in the predicted path, field 250 for storing branch dependency information, field 252 for storing information that indicates the branch was taken or not taken, field 254 for storing an instruction address of the first instruction following the conditional branch in the branch that was not predicted, and field 256 for storing the head pointer 222 in rename table 210 immediately preceding the conditional branch.

Branch resolution logic 258 receives the condition code data that the branch instruction is dependent on from the execution units. Using branch dependency information stored in field 250, and predicted information stored in field 252, branch resolution unit 258 determines if the direction that branch processing unit 102 predicted is correct or wrong. Branch resolution logic 258 sends "correct" or "wrong" resolution signals to all execution units. If the prediction is correct no corrective action is required. If the prediction is wrong all units will abort execution of speculative instructions that belong to the mispredicted path. The correct instruction is fetched from instruction cache 118 using the instruction address stored in field 254 of pending branch table 246.

With reference now to FIGS. 3A–3D, there are depicted various tables and table fields in accordance with the method and system of the present invention. More specifically, with reference to FIG. 3A, there is depicted rename table 210 having fields 212–220. Physical address pointers which are recalled from rename table 210 are stored in field 220. Rename table 210 is a content addressable memory addressed by matching information in fields 212–219. Field 212 stores architected register address pointers. Fields 214–219 store information (typically single bits) that indicate the present validity, or validity at some point in the past, of the association between architected register pointers stored in field 212 and physical register pointers stored in field 220.

With reference now to FIG. 3B, there is depicted completion rename table 226, which stores physical register address pointers. The number of entries in completion rename table 226 is equal to the number of architected registers in the data processing system. Completion rename table 226 serves to map architected register addresses to physical register addresses by storing physical register addresses in table entries having architected register address values. For example, a data processing system having 32 registers will utilize a completion register rename table 226 having 32 entries addressed zero to 31.

With reference now to FIG. 3C, lock register 232 is depicted. Typically, lock register 232 includes a single bit of information for each register in the data processing system wherein such bits indicate that in a corresponding physical register is either valid and available to be used by another instruction or invalid and unavailable. For example, a data processing system having 32 architected registers and 8 additional registers will have 40 entries in lock register 232.

Figure 3D:
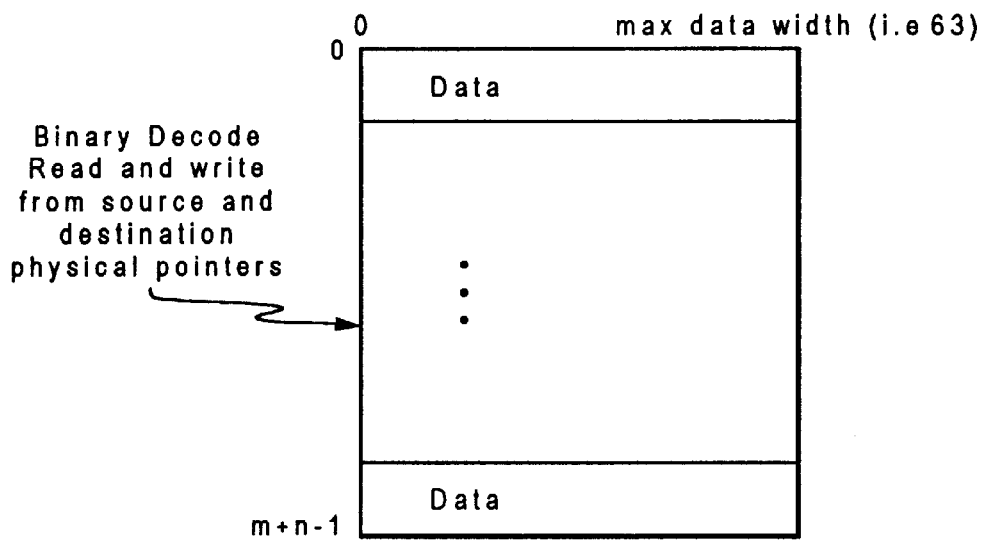

With reference now to FIG. 3D, there is depicted the register file configuration in the data processing system. The register file provides source and destination registers for all execution units in the data processing system. Registers used as source registers according to a dispatched instruction supply data to an execution unit, and a register specified as a destination or target register by a dispatched instruction provides a place to store a result produced by the execution unit. The register file includes a number of architected registers, plus an additional number of registers to be used according to the method and system of the present invention.

Figure 4:
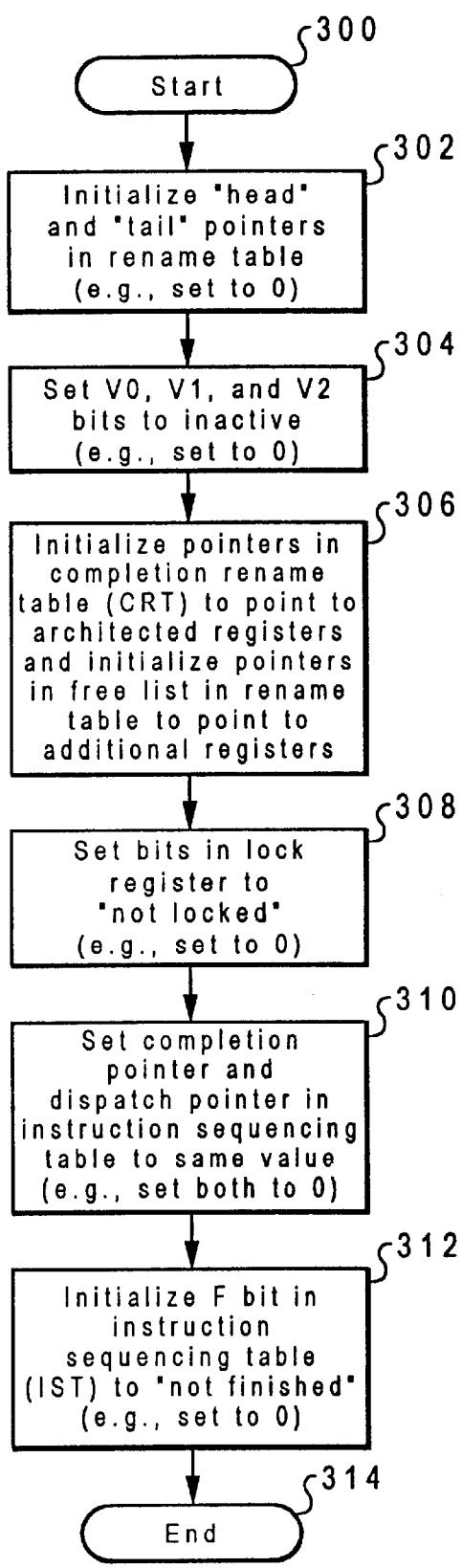
FIG. 4 is a high-level flowchart illustrating the process of initializing tables at power on reset in accordance with the method and system of the present invention.

With reference now to the flowcharts for a more detailed description of the operation of the present invention, FIG. 4 depicts a high-level flowchart illustrating the process of initializing tables at power-on reset in accordance with the method and system of the present invention. As illustrated, the process begins at block 300, and thereafter passes to block 302 wherein the "head" and "tail" pointers 222 and 224 in the rename table 210 are initialized (see FIG. 2). Typically, such head and tail pointers are set to zero during initialization.

Next, valid bits V0, V1, and V2 (fields 214–218 in FIG. 2) are set to indicate data entries in the rename table are inactive or invalid. Typically, such bits are set to zero. Next, pointers in the completion rename table are initialized to point to architected registers, and pointers in the "free list" (field 220 of rename table 210, see FIG. 2) are initialized to point to the additional registers (i.e., the registers in the array that exceed the number of architected registers), as depicted at block 306.

As the initialization process continues, bits in lock register 232 are set to indicate a "not locked" condition, as illustrated at block 308. Typically, such bits are set to zero to indicate not locked. In instruction sequencing table 234, completion pointer 244 and dispatch pointer 242 are set to the same value, as depicted at block 310. Typically, both pointers are set to zero. Also in the instruction sequencing table, F bits 236 are initialized to indicate a "not finished" state for each table entry, as illustrated at block 312. Typically, such F bits are set to zero. Thereafter, the process of initializing tables at power-on reset ends, as depicted at block 314.

Figure 5:
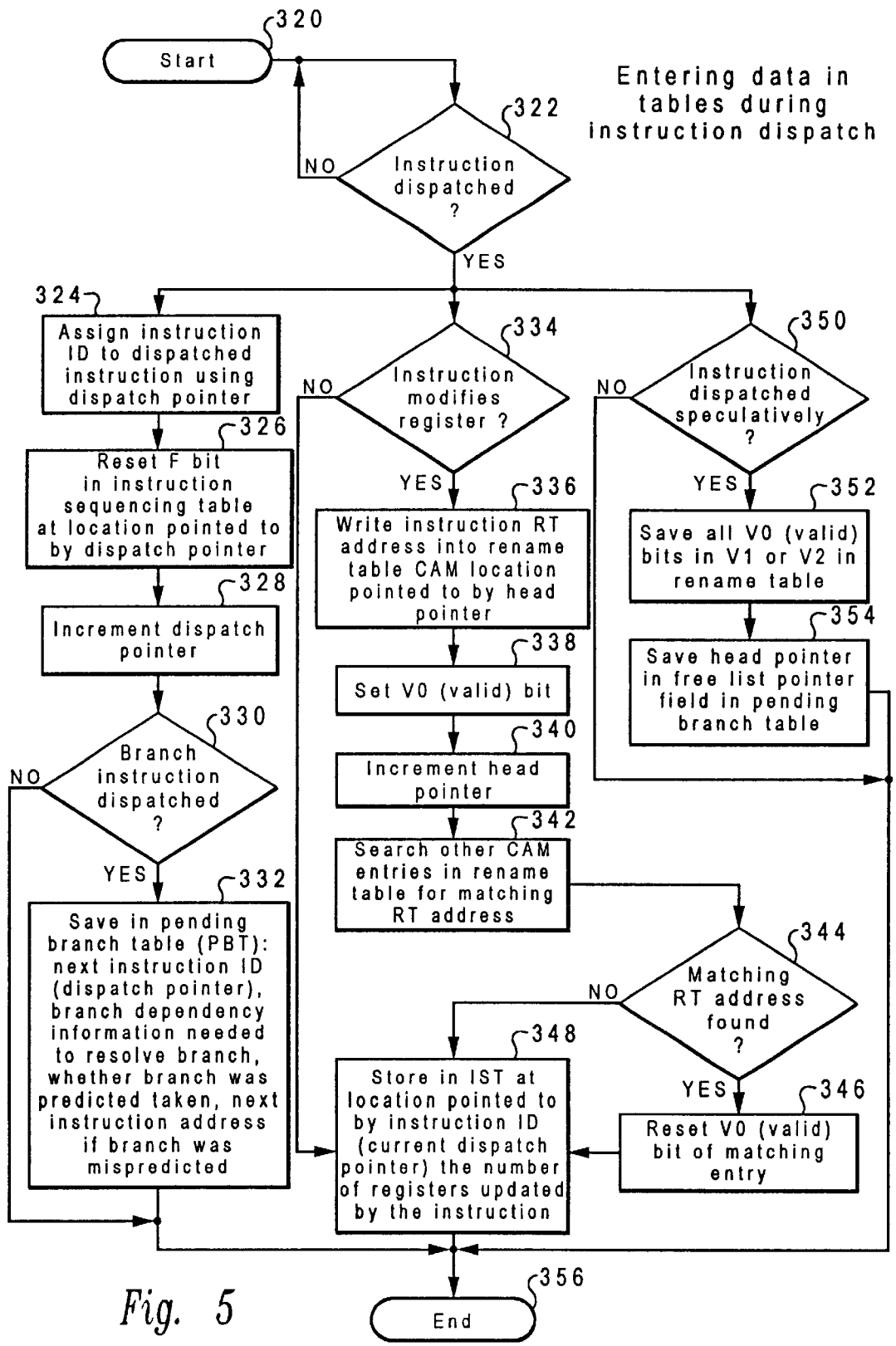
FIG. 5 is a high-level flowchart illustrating the process of entering data in tables during instruction dispatch in accordance with the method and system of the present invention.

With reference now to FIG. 5, there is depicted a high-level flowchart illustrating the process of entering data in tables during instruction dispatch in accordance with the method and system of the present invention. As depicted, the process begins at block 320 and thereafter passes to block 322 wherein the process determines whether or not an instruction has been dispatched. If an instruction has not been dispatched, the process waits until an instruction has been dispatched, as illustrated by the "no" branch from block 322. Those persons skilled in the art should recognize that more than one instruction may be dispatched in the same cycle. If more than one instruction is dispatched, the process described and illustrated in the flow charts below is repeated for each instruction within the duration of the cycle in which the instructions were dispatched.

If an instruction has been dispatched, the process begins several tasks in parallel. In one task, an instruction ID (IID) is assigned to each dispatched instruction using the dispatched pointer, as depicted at block 324. In the instruction sequencing table 234 at the location or table entry pointed to by the dispatch pointer 242, the F bit 236 is reset to indicate that the associated instruction has not yet finished, as illustrated by block 326.

Next, the dispatch pointer 242 is incremented to a new value for the next instruction to be dispatched, as depicted at block 328. Thereafter, the process determines whether or not a branch instruction was dispatched, as illustrated at block 330. If a branch instruction has been dispatched, the process saves the following information in the pending branch table 246: The next instruction ID 248 (i.e., the dispatch pointer), branch dependency information 250 needed to resolve the branch, whether or not the branch was taken, and the next instruction address 254 if the branch was mispredicted, as depicted at block 332. With reference again to block 330, if a branch instruction was not dispatched, the pending branch table is not modified.

In another parallel task, the process determines whether or not the dispatched instruction modifies or changes data in a register, as illustrated by block 334. If the dispatch instruction modifies a register, the process writes the architected target register address into the rename table CAM 212 location pointed to by the rename table head pointer 222, as depicted at block 336. The head pointer 222 points to the next rename table entry containing a physical register address that is available for receiving a result from the dispatched instruction.

Next, the process sets the V0 bit 214 to indicate that the association or mapping between the architected register address in field 212 and the physical register address in field 220 is active or valid, as illustrated by block 338. Next, the head pointer 222 is incremented, as depicted at block 340.

The process then searches other CAM entries in the rename table for an address that matches the current architected target register address written into the rename table, as illustrated at block 342. If the process determines that a matching architected register address has been found, as depicted at block 344, the process resets the V0 bit of the matching table entry to indicate that this table entry does not point to the most recent data for a particular architected register, as illustrated at block 346.

Following the search of the rename table and resetting the necessary V0 bits, the process stores the number of registers affected or updated by the instruction in the instruction sequencing table 234 at a location pointed to by the instruction ID (the current dispatch pointer), as depicted at block 348.

Referring again to block 334, if the dispatched instruction does not modify a register, the numbering of registers updated by the instruction that is entered into the IST is zero. In yet another parallel task, the process determines whether or not the instruction was dispatched speculatively—that is, dispatched following an unresolved conditional branch instruction—as illustrated at block 350. If the instruction was dispatched speculatively, the process saves all V0 bits 214 in the rename table 210 in either the V1 field 216 or the V2 field 218 (see FIG. 2), depending upon which of these fields is available to temporarily store the condition of the rename table before another speculatively branch is taken, as depicted at block 352. In addition to saving the valid bits, the process saves the head pointer 222 in the free list pointer field 256 in the pending branch table 246 (see FIG. 2), as illustrated at block 254.

Once these parallel tasks have been completed, the process of entering data in tables during instruction dispatch ends, as depicted at block 356.

Figure 6:
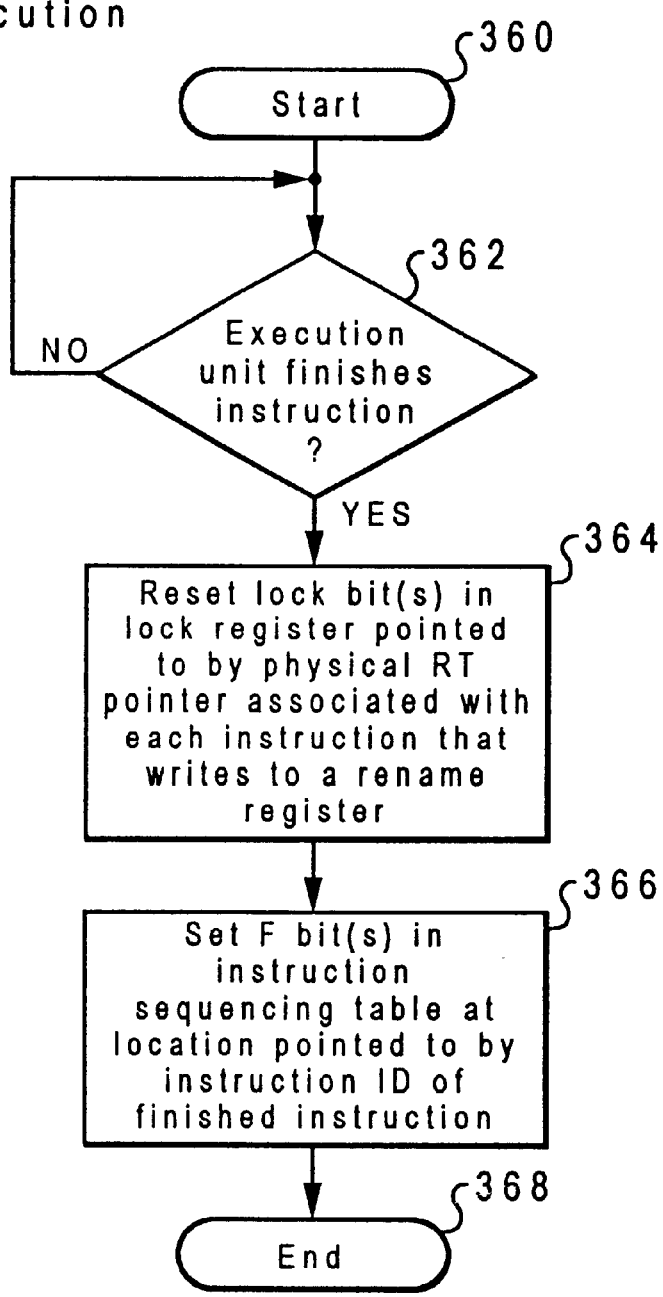
FIG. 6 is a high-level flowchart illustrating the process of modifying data in the tables during instruction execution according to the method and system of the present invention.

With reference now to FIG. 6, there is depicted a high-level flowchart illustrating the process of modifying data in the tables during instruction execution according to the method and system of the present invention. The process begins at block 360 and thereafter passes to block 362 wherein the process determines whether or not an execution unit has finished an instruction. If an execution unit has not finished an instruction, the process waits, as illustrated by the "no" branch from block 362.

If an execution unit has finished an instruction, the process resets the lock bit or lock bits in the lock register 232, wherein such bit(s) are pointed to by the physical address pointer associated with each finishing instruction that writes to a rename register, as illustrated at block 364. Resetting the lock bits places the lock bits in an "unlocked" condition so that other instructions waiting to use data in particular physical registers will be allowed to proceed using the correct data written by the recently finishing instruction.

Next, the process sets the F bit or bits 236 in the instruction sequencing table 234 at the location pointed to by the instruction ID of the finishing instruction, as depicted at block 366. Such F bits indicate that the finishing instruction is ready for completion. Thereafter, the process of modifying data in tables during instruction execution ends, as illustrated at block 368.

Figure 7:
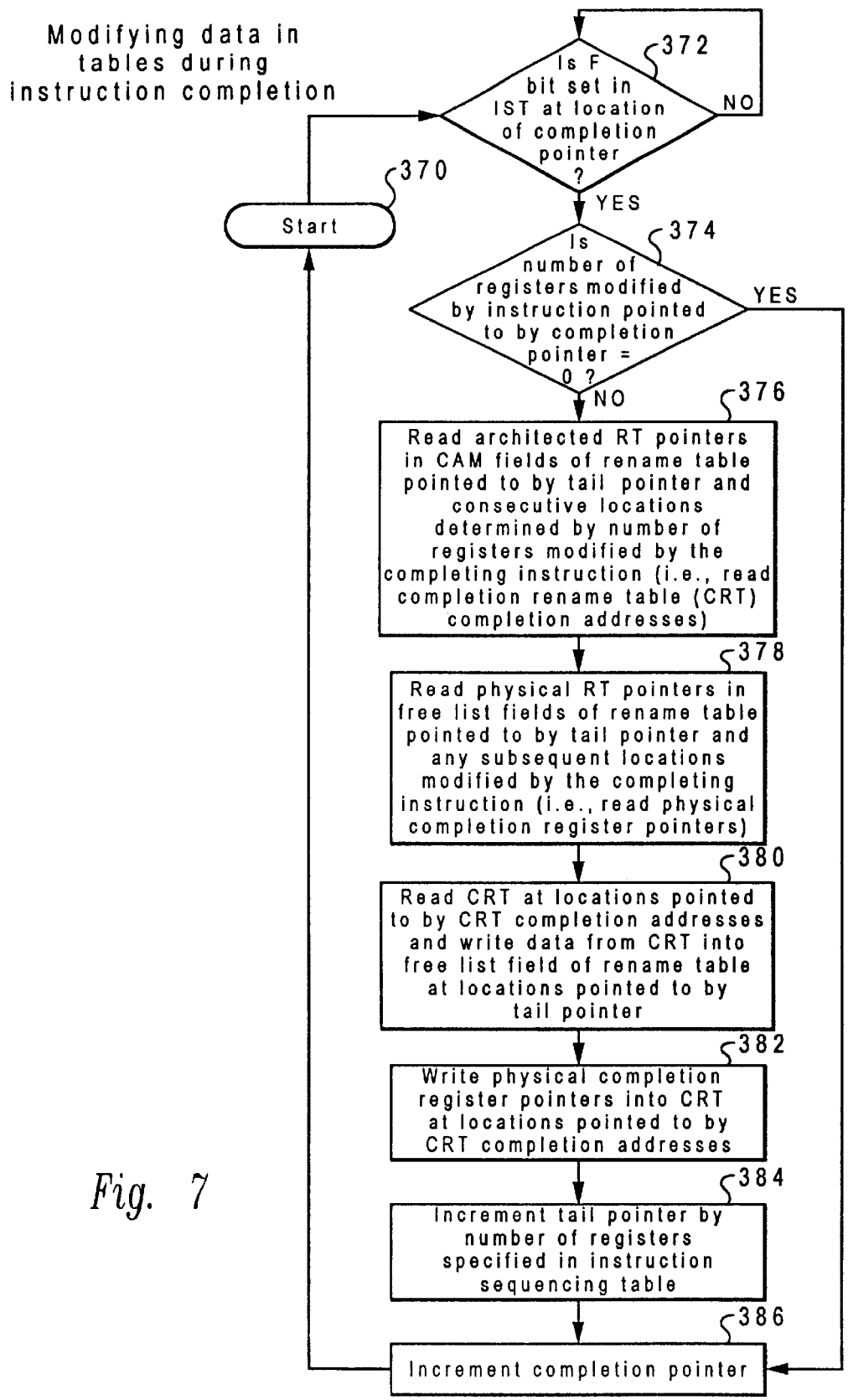
FIG. 7 is a high-level flowchart illustrating the process of modifying data in tables during instruction completion in accordance with the method and system of the present invention.

With reference now to FIG. 7, there is depicted a high-level flowchart illustrating the process of modifying data in tables during instruction completion in accordance with the method and system of the present invention. The process begins at block 370, and thereafter passes to block 372, wherein the process determines whether or not the F bit 236 is set in the instruction sequencing table 234 at the location pointed to by the completion pointer 244. If the F bit is not set at the completion pointer location, the process waits until the F bit is set, indicating that the instruction has finished.

If the F bit is set, the process determines whether or not the number of registers modified by the finishing instruction pointed to by the completion pointer is equal to zero, as illustrated at block 374. If the number of registers modified is not equal to zero, the process reads the architected register address in the CAM fields of the rename table pointed to by the tail pointer 244 and in consecutive locations determined by the number of registers modified by the completing instruction, as depicted at block 376. During this step, the process reads the completion rename table s (CRT) completion addresses from field 212 (see FIG. 2).

Next, the process reads the physical address pointers 220 in the rename table 210 pointed to by the tail pointer 224 and any subsequent locations modified by the completing instruction, as illustrated at block 378. In this step, the process reads the physical completion register pointers.

Next, the process reads the completion register table 226 at locations pointed to by the completion register table completion addresses, and writes data from the completion register table 226 into the free list field 220 of rename table 210 at locations pointed to by the tail pointer 224, as illustrated at block 380, and in a similar manner, the process writes the physical completion register pointers into the completion register table 226 at locations pointed to by the completion register table completion addresses, as depicted at block 382. Thereafter, the process increments the tail pointer 224 by the number of registers specified in the instruction sequencing table 234, as depicted at block 384.

Thus, the operation illustrated by blocks 376–384 perform an exchanging operation wherein a physical address in the rename table 210 is exchanged with a physical address in the completion rename table 226 so that the completion rename table 226 contains a current map of architected register addresses to physical register addresses, indicating the location of data resulting from completing instructions in program order. Physical addresses moved from completion rename table 226 to the rename table 210 will be reused as such physical address is associated with a newly dispatched instruction.

Referring again to block 374, if the process determines that the number of registers modified by the completing instruction is equal to zero, the process merely increments the completion pointer 244 in the instruction sequencing table 234, as depicted at block 386. Thereafter, the process returns to block 370 to await the completion of another instruction.

Figure 8:
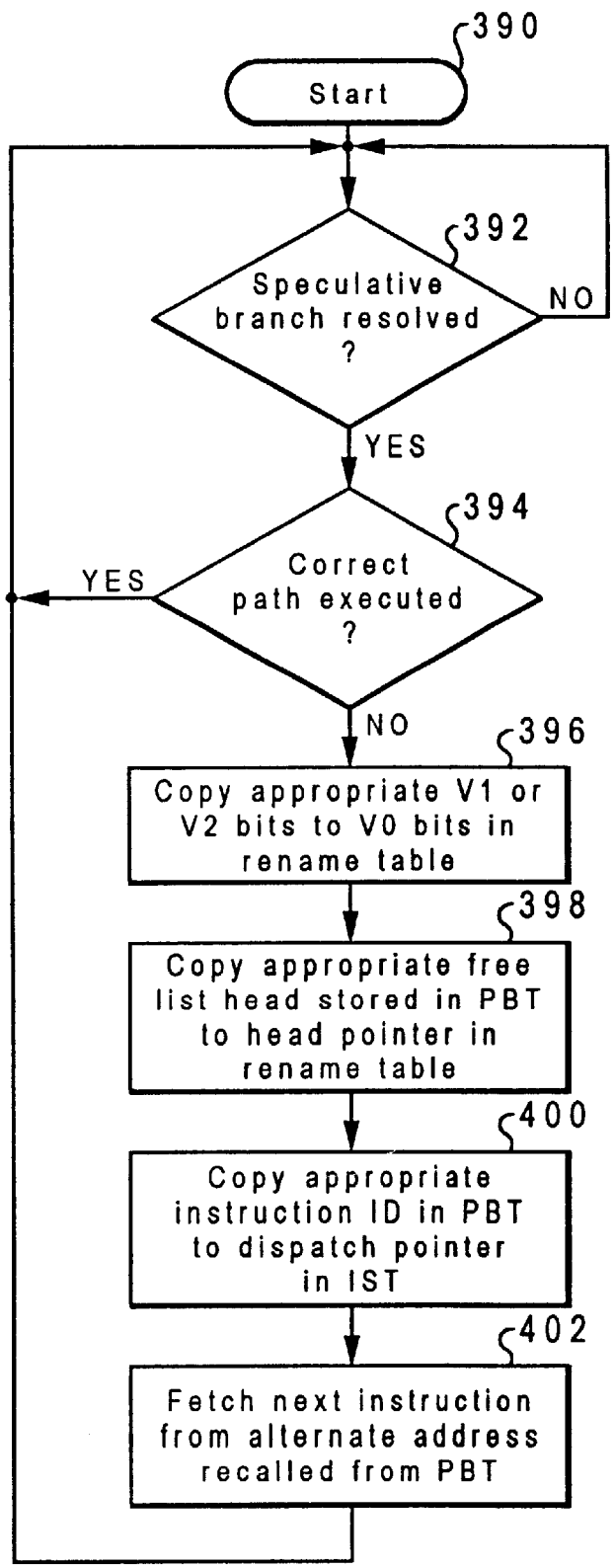
FIG. 8 is a high-level flow chart illustrating the process of modifying data in the tables when a conditional branch is resolved in accordance with the method and system of the present invention.

With reference now to FIG. 8, there is depicted the process of modifying data in the tables when a conditional branch is resolved in accordance with the method and system of the present invention. The process begins at block 390 and thereafter passes to block 392 wherein the process determines whether or not a speculative branch has been resolved. If a speculative branch has not been resolved, the process waits, as illustrated by the "no" branch from block 392.

If a speculative branch has been resolved, the process determines whether or not instructions in the correct path were executed, as illustrated at block 394. If instructions in the correct path were executed, the process returns to block 392 to await the resolution of the next speculative branch. If, however, instructions were executed in an incorrect path, the process copies the appropriate V1 216 or V2 218 bits to the V0 bit field 214 in rename table 210 (see FIG. 2), as depicted at block 396. V1 or V2 bits are selected depending upon which set of bits stored the condition of rename table 210 before the particular branch that was resolved. Thereafter, the process copies the appropriate free list head pointer stored in field 256 of pending branch table 246 to the head pointer 222 in rename table 210 (see FIG. 2), as illustrated at block 398. Thus, blocks 396 and 398 illustrate how the process restores the condition of the rename table 210 to its condition immediately preceding the mispredicted branch instruction.

Next, the process copies the appropriate instruction ID stored in field 248 in pending branch table 246 to dispatch pointer 242 in instruction sequencing table 234 (see FIG. 2), as depicted at block 400. The process then fetches the next instruction from the alternate address recalled from field 254 in pending branch table 246 (see FIG. 2), as illustrated at block 402. Thereafter, the process returns to block 392 to await the next resolution of a speculative branch instruction.

Figure 9:
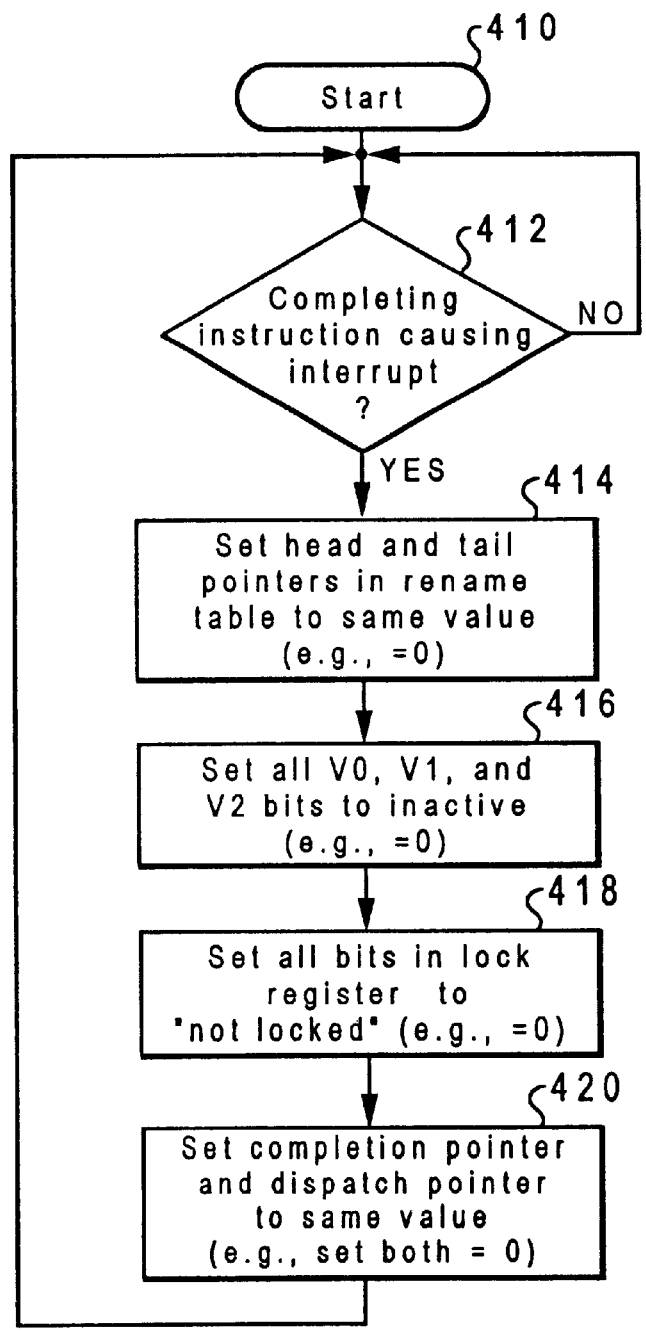
FIG. 9 is a high-level flowchart that shows the process of modifying data in tables upon the occurrence of an interrupt condition in accordance with the method and system of the present invention.

Referring now to FIG. 9, there is depicted a high-level flowchart that shows the process of modifying data in tables upon the occurrence of an interrupt condition in accordance with the method and system of the present invention. This process begins at block 410 and thereafter passes to block 412 wherein the process determines whether or not a completing instruction has caused an interrupt condition. If an interrupt condition has not been caused, the process waits for an interrupt condition as depicted by the "no" branch from block 412.

If a completing instruction has caused an interrupt condition, the process sets the head 222 and tail 224 pointers in the rename table 210 to the same value, which is typically equal to zero, as illustrated at block 414. Next, the process sets all valid bits, V0 214, V1 216, and V2 218, to indicate an inactive state, which is typically equal to zero, as depicted at block 416. The process then sets all bits in the lock register 232 to indicate a "not locked" condition, which is typically equal to zero, as illustrated at block 418 and finally, the process sets the completion pointer 244 and the dispatch pointer 242 in the instruction sequencing table 234 to the same value, wherein both are set (typically) to zero, as depicted at block 420.

After completing the process of modifying data upon the occurrence of an interrupt condition as described above, the process returns to block 412 to await the next occurrence of an interrupt condition.

Note that because the interrupt condition is processed during instruction completion, the completion rename table 210 actually reflects the state of the data processing system up to a point immediately preceding the instruction that caused the interrupt condition. Therefore, no adjustments to the rename table are necessary because the state of the machine registers are accurately stored in the completion rename table. An important advantage of the present invention over the prior art is that upon the occurrence of an interrupt condition, register mapping tables do not need to be copied or substituted by another table, thus reducing processor overhead during an interrupt condition, eliminating the need to restore registers following an interrupt routine, and reducing chip space required by the backup tables.

Figure 10:
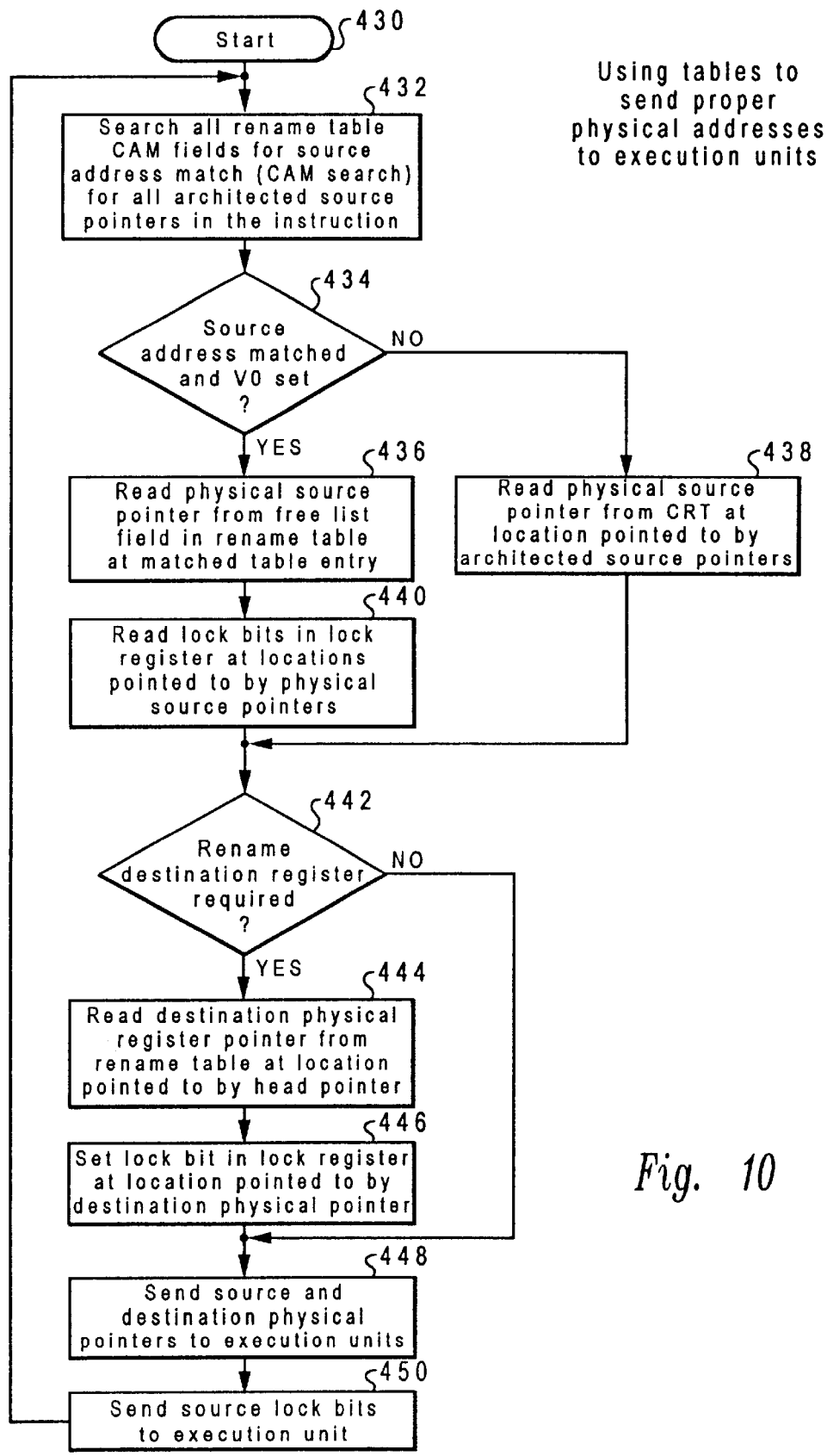
FIG. 10 is a high-level flowchart showing the process of using tables to send physical addresses to execution units in accordance with the method and system of the present invention.

Referring now to FIG. 10, there is a depicted a high-level flowchart showing the process of using tables to send physical addresses to execution units in accordance with the method and system of the present invention. The process begins at block 430 and thereafter passes to block 432 wherein the process searches all rename table CAM fields 212 and 214 for an architected source register address for all architected source pointers required by the instruction. This step may be referred to as a CAM search. Block 434 illustrates the process of determining whether or not a source register address in a source operand field in an instruction has matched a register address in field 212 of rename table 210 and such a table entry has its V0 bit 214 set to indicate that it is active or valid. If such a match has occurred, the process reads the physical register address pointer from free list field 220 in rename table 210 at the matching table entry, as depicted at block 436. The process then reads the lock bits in the lock register 232 at locations pointed to by physical source register pointers, as illustrated at block 440. Such lock bits prevent the execution unit from utilizing data stored in the physical register before such data is valid.

Referring again to block 434, if a source address match is not found in field 212 of rename table 210, the process reads the physical source pointer from the completion rename table 226 at the location in the table pointed to by the architected source pointers, as depicted at block 438. Thus, if the instruction that produced the source result required by the currently dispatched instruction has completed, physical source pointers will be obtained from the completion rename table 226. Otherwise, if the instruction that calculates the source for the currently dispatching instruction has not yet completed, the physical source pointers are read from field 220 in rename table 210. Moreover, any information sent to execution units from rename table 210 must be verified as active or valid, as indicated by the V0 bit.

Once physical source register addresses have been read from either the rename table or the completion rename table, the process determines whether or not destination register address is required, as depicted at block 442. If a destination or target register is required by the instruction, the process reads the destination physical register pointer from the rename table at a location pointed to by head pointer 222, as illustrated at block 444. Thereafter, the process sets the lock bit in the lock register 232 at the location pointed to by the destination physical register pointer, as depicted at block 446.

If a destination register is not required, or after the destination physical register pointer has been obtained from the rename table, the process sends the source and destination physical pointers to the requesting execution unit, as illustrated at block 448. The process also sends the source lock bits to the requesting execution unit, as depicted at block 450. Thus, the flowchart of FIG. 10 describes the process of providing current source and destination register information, including lock bit information, to an execution unit when an instruction requiring such information is dispatched to the execution unit.

The invention described above is an efficient method and system for managing a register array in a data processing system that executes instructions out of order and speculatively executes instructions following conditional branches. The present invention utilizes two tables to map a number of architected registers to a corresponding one of a greater number of registers in a register array. The present invention provides quick and easy recovery of information stored in one of such tables upon the determination that a conditional branch has been mispredicted. During an interrupt condition, or during recovery from a mispredicted branch, data in only one of the two tables must be processed or adjusted, while the other table always maintains a current map of registers according to the in-order completion of instructions.

In another embodiment of the present invention, the three valid bits, V0, V1, and V2, may be treated as equal, instead of as a primary and two levels of backups. When a valid bit is set by the destination register renaming, the corresponding bit in another available valid columns are also set. Then, when a conditional branch is encountered, a particular valid column is marked unavailable. The correct valid bit for each free list entry will be chosen by a MUX from the three valid bit columns, depending upon which column is the current column. Thus, copying between primary and the two levels of backups may be avoided.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system for managing a register array, wherein said data processing system includes M architected registers and said register array includes M registers and N additional registers, and wherein said data processing system dispatches instructions to a selected one of a plurality of execution units, said method comprising the steps of:

in response to dispatching a register-modifying instruction having an architected target register address, selecting a first physical register address from a rename table;

associating said architected target register address with said first physical register address;

storing a result of executing said register-modifying instruction in a register pointed to by said first physical register address; and in response to completing said register-modifying instruction, exchanging said first physical address in said rename table with a second physical address in a completion rename table that is stored at a location pointed to by said architected target register address, wherein said register-modifying instruction is associated with said first physical register address from said rename table, and, upon completion of said register-modifying instruction, said second physical address is moved to said rename table to be available for association with a subsequent register-modifying instruction.

2. The method in a data processing system for managing a register array according to claim 1 wherein said rename table includes a content addressable memory, and wherein said step of associating said architected target register address with said first physical register address includes storing said architected target register address in a same table entry with said first physical register address.

3. The method in a data processing system for managing a register array according to claim 2 wherein said rename table includes a head pointer for pointing to a rename table entry, and wherein said step of storing said architected target register address in a same table entry with said first physical register address includes the steps of:

storing said architected target register address in a same table entry with said first physical register address at a table entry pointed to by said head pointer; and incrementing said head pointer to point to a next table entry in said rename table.

4. The method in a data processing system for managing a register array according to claim 2 wherein said rename table includes a valid field, and wherein said method further includes the steps of:

in response to associating said architected target register address with said first physical register address, indicating said association between said architected target register address and said first physical register address in said table entry in said rename table is valid by setting a valid bit in said valid field; and in response to exchanging said first physical address in said rename table with a second physical address in a completion rename table that is stored at a location pointed to by said architected target register address, indicating said association between said architected target register address and said second physical register address in said table entry in said rename table is invalid by resetting said valid bit in said valid field.

5. The method in a data processing system for managing a register array according to claim 4 wherein said data processing system can speculatively dispatch register-modifying instructions, and wherein said rename table includes a V1 field, wherein said method further includes the steps of:

in response to speculatively dispatching a first register-modifying instruction in a first speculative instruction path in response to a first conditional branch instruction, copying bits in each of said valid fields to a corresponding one of said V1 fields for storing a condition of said rename table prior to said speculatively dispatched first register-modifying instruction; and in response to determining said first conditional branch instruction was mispredicted, copying bits in each of said V1 fields to a corresponding one of said valid fields for restoring said condition of said rename table prior to said speculatively dispatched first register-modifying instruction.

6. The method in a data processing system for managing a register array according to claim 5 wherein said re name table includes a V2 field, and wherein said method further includes the steps of:

in response to speculatively dispatching a second register-modifying instruction in a second speculative instruction path in response to a second conditional branch instruction before said first conditional branch instruction is resolved, copying bits in each of said valid fields to a corresponding one of said V2 fields for storing a condition of said rename table prior to sa id speculatively dispatched second register-modifying instruction; and in response to determining said second conditional branch instruction was mispredicted, copying bits in each of said V2 fields to a corresponding one of said valid fields for restoring said condition of said rename table prior to said speculatively dispatched second register-modifying instruction.

7. The method in a data processing system for managing a register array according to claim 6 wherein said data processing system includes a pending branch table, and wherein said method further includes the steps of:

in response to speculatively dispatching said first register-modifying instruction in said first speculative instruction path in response to said first conditional branch instruction, saving data in a first table entry in said pending branch table for determining if said first speculative instruction path was correctly taken, and for restoring said rename table to a condition that existed before said first conditional branch instruction; and in response to speculatively dispatching a second register-modifying instruction in a second speculative instruction path in response to a second conditional branch instruction before said first conditional branch instruction is resolved, saving data in a second table entry in said pending branch table for determining if said second speculative instruction path was correctly taken, and for restoring said rename table to a condition that existed before said second conditional branch instruction.

8. A data processing system for managing a register array, wherein said data processing system includes M architected registers and said register array includes M registers and N additional registers, and wherein said data processing system dispatches instructions to a selected one of a plurality of execution units, said data processing system comprising:

means for selecting a first physical register address from a rename table in response to dispatching a register-modifying instruction having an architected target register address;

means for associating said architected target register address with said first physical register address;

means for storing a result of executing said register-modifying instruction in a register pointed to by said first physical register address; and means for exchanging said first physical address in said rename table with a second physical address in a completion rename table that is stored at a location pointed to by said architected target register address in response to completing said register-modifying instruction, wherein said register-modifying instruction is associated with said first physical register address from said rename table, and, upon completion of said register-modifying instruction, said second physical address is moved to said rename table to be available for association with a subsequent register-modifying instruction.

9. The data processing system for managing a register array according to claim 8 wherein said rename table includes a content addressable memory, and wherein said means for associating said architected target register address with said first physical register address includes means for storing said architected target register address in a same table entry with said first physical register address.

10. The data processing system for managing a register array according to claim wherein said rename table includes a head pointer for pointing to a rename table entry, and wherein said means for storing said architected target register address in a same table en try with said first physical register address includes:

means for storing said architected target register address in a same table entry with said first physical register address at a table entry pointed to by said head pointer; and means for incrementing said head pointer to point to a next table entry in said rename table.

11. The data processing system for managing a register array according to claim 9 wherein said rename table includes a valid field, and wherein said data processing system further includes:

means for indicating said association between said architected target register address and said first physical register address in said table entry in said rename table is valid by setting a valid bit in said valid field in response to associating said architected target register address with said first physical register address; and means for indicating said association between said architected target register address and said second physical register address in said table entry in said rename table is invalid by resetting said valid bit in said valid field in response to exchanging aid first physical address in said rename table with a second physical address in a completion rename table that is stored at a location pointed to by said architected target register address.

12. The data processing system for managing a register array according to claim 11 wherein said data processing system can speculatively dispatch register-modifying instructions, and wherein said rename table includes a V1 field, wherein said data processing system further includes:

means for copying bits in each of said valid fields to a corresponding one of said V1 fields for storing a condition of said rename table prior to said speculatively dispatched first register-modifying instruction in response to speculatively dispatching a first register-modifying instruction in a first speculative instruction path in response to a first conditional branch instruction; and means for copying bits in each of said V1 fields to a corresponding one of said valid fields for restoring said condition of said rename table prior to said speculatively dispatched first register-modifying instruction in response to determining said first conditional branch instruction was mispredicted.

13. The method in a data processing system for managing a register array according to claim 12 wherein said rename table includes a V2 field, and wherein said method further includes the steps of:

in response to speculatively dispatching a second register-modifying instruction in a second speculative instruction path in response to a second conditional branch instruction before said first conditional branch instruction is resolved, copying bits in each of said valid fields to a corresponding one of said V2 fields for storing a condition of said rename table prior to said speculatively dispatched second register-modifying instruction; and in response to determining said second conditional branch instruction was mispredicted, copying bits in each of said V2 fields to a corresponding one of said valid fields for restoring said condition of said rename table prior to said speculatively dispatched second register-modifying instruction.

14. The data processing system for managing a register array according to claim 13 wherein said data processing system includes a pending branch table, and wherein said data processing system further includes:

means for saving data in a first table entry in said pending branch table for determining if said first speculative instruction path was correctly taken, and for restoring said rename table to a condition that existed before said first conditional branch instruction, in response to speculatively dispatching said first registers modifying instruction in said first speculative instruction path in response to said first conditional branch instruction; and means for saving data in a second table entry in said pending branch table for determining if said second speculative instruction path was correctly taken, and for restoring said rename table to a condition that existed before said second conditional branch instruction, in response to speculatively dispatching a second register-modifying instruction in a second speculative instruction path in response to a second conditional branch instruction before said first conditional branch instruction is resolved.

* * * * *

UNITED STATES PATENT AND TRADEMARK OFFICE
CERTIFICATE OF CORRECTION

PATENT NO.    : 6,356,918 B1
DATED         : March 12, 2002
INVENTOR(S)   : Chuang et al.

It is certified that error appears in the above-identified patent and that said Letters Patent is hereby corrected as shown below:

<u>Title page,</u>
Item [54], please add the word -- THAT -- after "SYSTEM";

<u>Column 16,</u>
Line 46, please add -- 9 -- after "claim";

<u>Column 17,</u>
Line 5, please add -- said -- after "exchange" and delete "aid";

<u>Column 18,</u>
Line 20, please delete "registers modifying" and add -- register-modifying --.

Signed and Sealed this

Twenty-fifth Day of June, 2002

Attest:

Attesting Officer

JAMES E. ROGAN
*Director of the United States Patent and Trademark Office*